United States Patent [19]

Matzen

[11] 4,204,814

[45] May 27, 1980

[54] FUEL INJECTION PUMP WITH ROLLER SHAFT FOR INTERNAL COMBUSTION ENGINES

[75] Inventor: Max Matzen, Leverkusen, Fed. Rep. of Germany

[73] Assignee: Klöckner-Humboldt-Deutz Aktiengesellschaft, Cologne, Fed. Rep. of Germany

[21] Appl. No.: 888,753

[22] Filed: Mar. 21, 1978

[30] Foreign Application Priority Data

Mar. 22, 1977 [DE] Fed. Rep. of Germany ....... 2712450

[51] Int. Cl.[2] ....................... F04B 39/00; F16H 53/06

[52] U.S. Cl. ....................................... 417/437; 74/569

[58] Field of Search ................... 74/569, 55; 123/90.5; 417/490, 499, 437

[56] References Cited

U.S. PATENT DOCUMENTS

| | | | |
|---|---|---|---|
| 1,748,086 | 2/1930 | Small | 74/569 |
| 2,508,557 | 5/1950 | Wood, Jr. | 74/569 |
| 3,590,796 | 11/1969 | Harkness | 123/90.5 |
| 3,822,683 | 7/1974 | Clouse | 74/569 |
| 3,998,190 | 12/1976 | Keske | 74/569 |

FOREIGN PATENT DOCUMENTS

| | | | |
|---|---|---|---|
| 989536 | 9/1951 | France | 74/569 |
| 1114723 | 4/1956 | France | 74/569 |

*Primary Examiner*—William L. Freeh

*Attorney, Agent, or Firm*—Becker & Becker, Inc.

[57] ABSTRACT

A fuel injection pump with roller shaft for internal combustion engines, in which the roller is loosely journalled in a substantially cylindrical opening provided in a shaft or push member actuated in upward direction by a cam and in downward direction into its lower dead center position by a spring. The roller shaft or push member is at that end portion which is adjacent the roller provided with supporting surfaces by means of which the roller shaft when occupying its lower dead center position rests upon shoulders of a camshaft at opposite sides of the above mentioned cam. The diameter of the camshaft substantially equals the diameter of the high level portion of the cam. When the roller shaft rests on these shoulders, a gap is formed between the wall of the opening in the roller shaft and the roller so that sufficient lubricant can collect in the gap to assure proper lubrication of the roller, even when the roller shaft is under great load.

5 Claims, 4 Drawing Figures

FUEL INJECTION PUMP WITH ROLLER SHAFT FOR INTERNAL COMBUSTION ENGINES

The present invention relates to a fuel injection pump with roller shaft for internal combustion engines in which the roller is loosely journalled in a substantially cylindrical opening provided in a shaft or push member, and in which the wall of said opening surrounds the roller over more than half the circumference of the latter while means are provided for preventing the roller from dropping out of said opening in axial direction.

A roller shaft of the above mentioned general type has become known from German Offenlegungsschrift No. 22 40 074. In view of the shape of such roller shaft, the latter is able, in spite of a small overall volume, to transmit large forces, however the direct mounting of the roller in the cylindrical opening causes difficulties with regard to lubricating the roller because it is not assured that always a sufficient quantity of lubricant enters the lubricating gap.

It is, therefore, an object of the present invention to provide means which will assure a safe and satisfactory lubrication of the roller.

This object and other objects and advantages of the invention will appear more clearly from the following specification in connection with the accompanying drawings, in which.

Figures 1, 2:
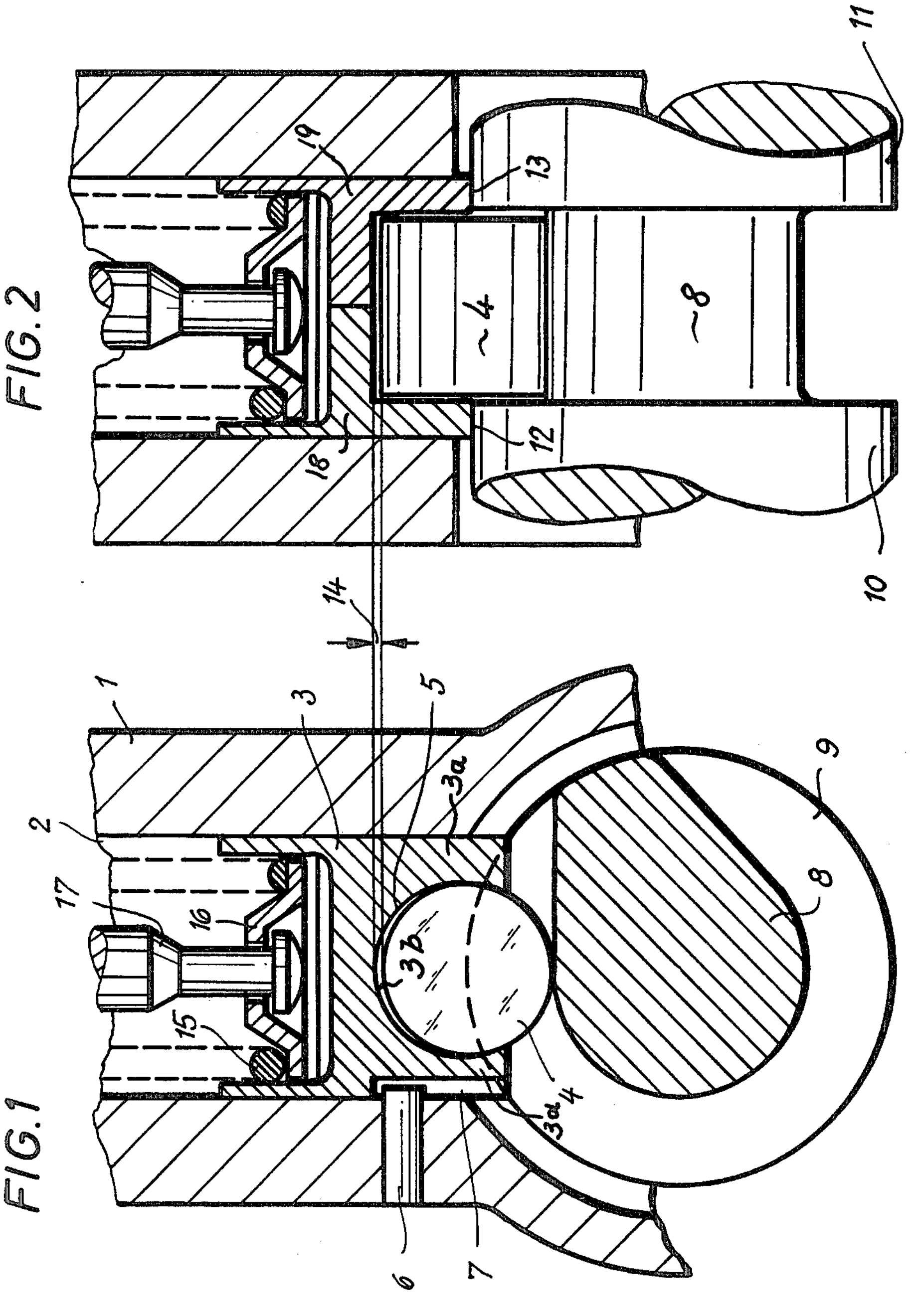
FIG. 1 represents a fragmentary cross section through a fuel injection pump with a roller shaft according to the invention.
FIG. 2 is a fragmentary longitudinal section through a fuel injection pump similar to that of FIG. 1 but differing therefrom primarily in that the roller shaft is divided into two sections.

The fuel injection pump with roller shaft according to the present invention is characterized primarily in that the roller shaft is at the end faces of the roller provided with supporting surfaces by means of which the roller shaft in its lower dead center position rests laterally of a cam on shoulders of a camshaft. According to a further feature of the invention, the diameter of said camshaft substantially equals the diameter of the high level portion of the cam.

According to a still further feature of the invention, the roller shaft is divided between the two supporting surfaces parallel to the axis of the roller shaft, so as to form two sections which are held together by guiding means in the housing of the fuel injection pump.

Due to the configuration of the rollershaft, the roller is relieved in its lower dead center point position so that between a confining wall of the roller shaft and the roller within the bearing play at the loaded side of said confinement, a gap is maintained into which lubricant can easily enter. The relative movement between the roller and the confinement therefor furthermore brings about that an increased amount of lubricating oil is drawn into the bearing gap. As a result thereof, the lubrication is improved in all areas of operation.

The division of the roller shaft as outlined above greatly facilitates the mounting of the roller shaft. Instead of holding the roller shaft sections together by the housing of the fuel injection pump, it is of course also possible to connect the sections of the roller shaft by screws, pins or rings applied from the outside to the sections.

Referring now to the drawings in detail, a roller shaft 3 is axially displaceably arranged in a bore 2 of a pump housing 1. The roller shaft carries a roller 4 the axis of which extends transverse to the axis of the roller shaft 3. The roller shaft 3 has that end thereof which is adjacent the roller 4 provided with legs 3*a* the inner wall or bearing surface 5 of which defines a circular opening 3*b*. As will be seen from FIG. 1, said inner wall surrounds the roller along a circle in excess of 180°. A pin 6 transversing the wall of the pump housing extends into a longitudinal groove 7 of the roller shaft 3 and secures the roller shaft against accidental turning. The roller 5 is adapted to roll on a cam 8 of a camshaft 9 which at both sides of the cam 8 is provided with shoulders 10 and 11 which have substantially the same diameter as the high level portion of the cam 8. In the lower dead center point of cam 8, the roller shaft 3 by means of its supporting surfaces 12 and 13 rests respectively on shoulders 10 and 11. As a result thereof, the roller 4 is relieved and a gap 14 is formed between the cylindrical inner wall surface 5 and the roller 4. In view of the radial extension of roller 4 in the relieved phase, a sufficient quantity of lubricant can enter the gap 14 so that even when the roller shaft is exposed to a high load, damages within the region of the roller bearing surface will be avoided.

The roller shaft 3 by means of a spring 15 is pressed against the shoulders 10 and 11 which force is conveyed through roller 4 to cam 8 of camshaft 9. A spring dish 16 pertaining to spring 15 simultaneously serves for receiving a pump piston 17.

Figure 3:
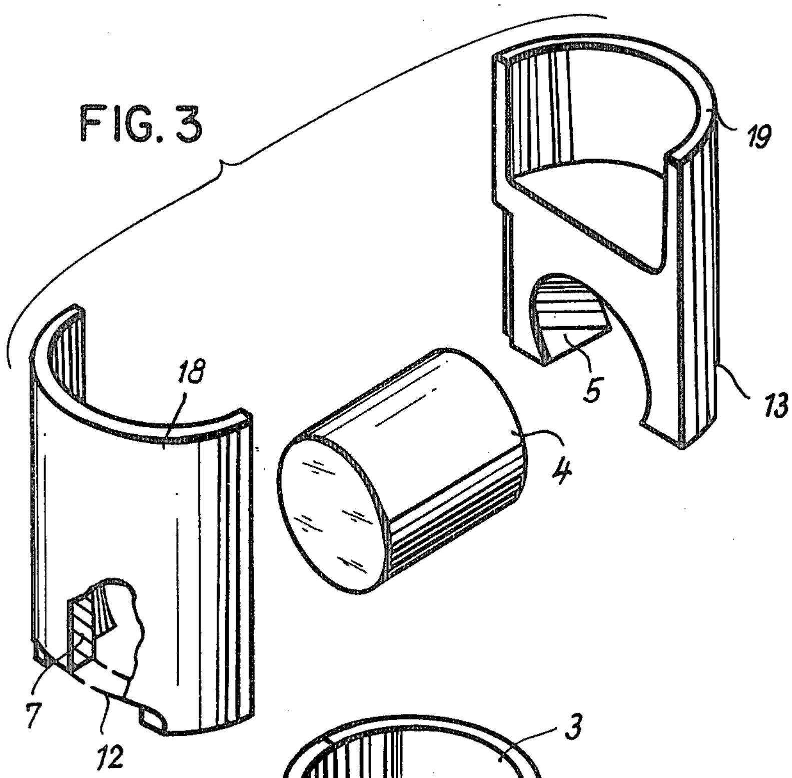
FIG. 3 is an exploded view of a roller shaft of FIG. 2.
Figure 4:
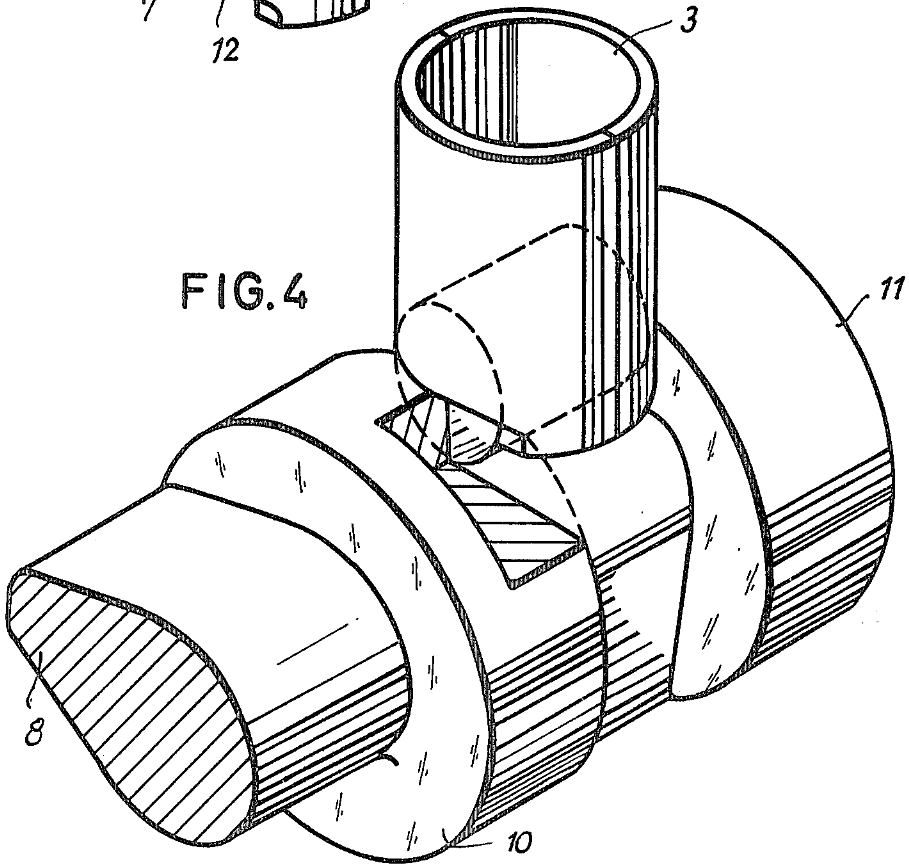
FIG. 4 is an isometric view of the roller shaft according to the invention together with the roller and a camshaft.

As will be seen from FIGS. 2 and 3, the roller shaft 3 is divided by a central plane extending through the longitudinal axis of the roller shaft 3 and substantially perpendicular to the axis of rotation of the roller 4. The two sections into which the roller shaft 3 is divided by said last mentioned plane are designated with the reference numerals 18 and 19 and are held together by the pump housing wall defining the bore 2 of the pump housing.

It is, of course, to be understood that the present invention is, by no means, limited to the specific showing in the drawings, but also comprises any modifications within the scope of the appended claims.

What I claim is:

1. A fuel injection pump for internal combustion engines, which includes: a pump housing, having a bore, a pump shaft reciprocably mounted in said bore, a camshaft having two axially spaced shoulders, a cam provided between said shoulders, a roller shaft having one end thereof facing said cam provided with two legs defining a recess with a curved inner surface, and a roller with a cylindrical peripheral surface, said roller being rotatably arranged in said recess and protruding therefrom while being in rolling engagement with said cam, the curvature of said curved surface corresponding to the curvature of said cylindrical peripheral surface of said roller, the arrangement being such that in the lower dead center position of said camshaft that portion of said recess surface which is remote from and opposite the contacting area of said roller with said cam describes with said recess surface a crescent shaped gap adapted to receive lubricant while in said lower dead center position the free ends of said legs rest upon said axially spaced sections thereby relieving said roller from pressure acting upon said roller shaft in the direction toward said cam.

2. A fuel injection pump according to claim 1, in which the diameter of said camshaft shoulders substantially equals the diameter of the high level portion of said cam.

3. A fuel injection pump according to claim 1, in which said roller shaft is divided into said two sections by a plane substantially perpendicular to the axis of rotation of said roller.

4. A fuel injection pump according to claim 1, in which said legs surround said roller over more than half the circumference of the latter.

5. A fuel injection pump according to claim 1, in which said roller shaft has longitudinally extending slot means, and which includes pin means arranged in said pump housing and engaging said slot means for preventing rotation of said roller shaft.

* * * * *